(12) United States Patent
Unagami et al.

(10) Patent No.: US 12,355,896 B2
(45) Date of Patent: *Jul. 8, 2025

(54) VERIFICATION METHOD, VERIFICATION APPARATUS, AND STORAGE MEDIUM INCLUDING PROGRAM STORED THEREIN

(71) Applicant: PANASONIC INTELLECTUAL PROPERTY CORPORATION OF AMERICA, Torrance, CA (US)

(72) Inventors: Yuji Unagami, Osaka (JP); Manabu Maeda, Osaka (JP); Tomoyuki Haga, Nara (JP); Hideki Matsushima, Tokyo (JP); Jun Anzai, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 18/131,448

(22) Filed: Apr. 6, 2023

(65) Prior Publication Data

US 2023/0246849 A1 Aug. 3, 2023

Related U.S. Application Data

(63) Continuation of application No. 17/101,876, filed on Nov. 23, 2020, now Pat. No. 11,652,643, which is a
(Continued)

(30) Foreign Application Priority Data

May 15, 2017 (JP) .................................. 2017-096225
Jan. 23, 2018 (JP) .................................. 2018-009147

(51) Int. Cl.
*H04L 9/40* (2022.01)
*G06F 21/62* (2013.01)
(Continued)

(52) U.S. Cl.
CPC ........ *H04L 9/3247* (2013.01); *G06F 21/6236* (2013.01); *G06F 21/64* (2013.01);
(Continued)

(58) Field of Classification Search
CPC ... H04L 9/3247; H04L 9/3242; H04L 63/123; H04L 67/12; H04L 2209/84; H04L 63/12;
(Continued)

(56) References Cited

U.S. PATENT DOCUMENTS 8,171,295 B2 * 5/2012 Munetoh ................. G06F 21/57
713/176
8,634,559 B2 * 1/2014 Brown ................... H04L 9/3252
340/12.51
(Continued)

FOREIGN PATENT DOCUMENTS

JP 2007-535189 A 11/2007
JP 2008-175648 A 7/2008
(Continued)

OTHER PUBLICATIONS

International Search Report of International Application No. PCT/JP2018/004973 dated May 22, 2018.
(Continued)

*Primary Examiner* — Badri Narayanan Champakesan
*Assistant Examiner* — Badri Champakesan
(74) *Attorney, Agent, or Firm* — GREENBLUM & BERNSTEIN, P.L.C.

(57) ABSTRACT

A method for verifying content data to be used in a vehicle is provided. The method includes acquiring content data, acquiring, from partial data divided from the content data, a respective plurality of first hash values, acquiring a signature generated by using the first hash values and a key, acquiring state information that indicates a state of a vehicle, determining an integer N that is greater than or equal to one based (Continued)

on the acquired state information, generating, from N pieces of partial data included in the partial data, respective second hash values, verifying the content data by using each of (a) a subset of the plurality of first hash values respectively generated from partial data other than the N pieces of partial data, (b) the second hash values, and (c) the signature, and outputting information that indicates a result of the verifying.

11 Claims, 11 Drawing Sheets

Related U.S. Application Data continuation of application No. 16/264,804, filed on Feb. 1, 2019, now Pat. No. 10,887,111, which is a continuation of application No. PCT/JP2018/004973, filed on Feb. 14, 2018.

(51) Int. Cl.
    *G06F 21/64*     (2013.01)
    *H04L 9/32*     (2006.01)
    *H04L 67/12*     (2022.01)
    *G08G 1/09*     (2006.01)

(52) U.S. Cl.
    CPC .......... *H04L 9/3242* (2013.01); *H04L 63/123* (2013.01); *H04L 67/12* (2013.01); *G08G 1/09* (2013.01); *H04L 2209/84* (2013.01)

(58) Field of Classification Search
    CPC . H04L 63/1483; G06F 21/6236; G06F 21/64; G08G 1/09; G08G 1/00; G08G 1/096775; G08G 1/096783; G08G 1/0116; G08G 1/0141; G08G 1/0112; G09C 1/00; H04W 12/12; H04W 12/1006
    USPC ........................................................ 713/176
    See application file for complete search history.

(56) References Cited

U.S. PATENT DOCUMENTS

| | | | | |
|---|---|---|---|---|
| 8,788,841 | B2* | 7/2014 | Aciicmez | G06F 16/24568 380/42 |
| 8,972,736 | B2* | 3/2015 | Peirce | H04L 63/0428 713/176 |
| 9,697,217 | B1* | 7/2017 | Salyers | G06F 16/137 |
| 9,832,022 | B1* | 11/2017 | Pedersen | H04L 9/3247 |
| 10,110,385 | B1* | 10/2018 | Rush | H04L 9/3234 |
| 2002/0152389 | A1* | 10/2002 | Horita | G06F 21/64 713/180 |
| 2002/0184504 | A1* | 12/2002 | Hughes | H04L 9/3247 713/176 |
| 2007/0198838 | A1 | 8/2007 | Nonaka et al. | |
| 2009/0006853 | A1* | 1/2009 | Li | H04L 63/0428 713/176 |
| 2009/0199010 | A1* | 8/2009 | Hakuta | H04L 9/3247 713/176 |
| 2010/0070772 | A1 | 3/2010 | Nakamura et al. | |
| 2010/0295803 | A1* | 11/2010 | Kim | G06F 3/167 345/173 |
| 2011/0126295 | A1* | 5/2011 | Resch | G06F 16/215 726/27 |
| 2012/0237180 | A1 | 9/2012 | Yoshioka | |
| 2013/0054971 | A1 | 2/2013 | Yamaguchi et al. | |
| 2013/0058477 | A1 | 3/2013 | Kobayashi et al. | |
| 2013/0145167 | A1* | 6/2013 | Farrugia | G06F 16/2255 713/176 |
| 2013/0286996 | A1* | 10/2013 | Takeda | H04W 72/20 370/329 |
| 2014/0006778 | A1* | 1/2014 | Dixon | H04L 9/3234 713/168 |
| 2014/0304515 | A1* | 10/2014 | Feuerman | H04L 63/123 713/176 |
| 2014/0331100 | A1* | 11/2014 | Dhuse | G06F 16/215 714/752 |
| 2016/0308887 | A1* | 10/2016 | Jung | H04L 63/1416 |
| 2017/0250965 | A1* | 8/2017 | Resch | H03M 13/2909 |
| 2017/0289151 | A1* | 10/2017 | Shanahan | G06F 12/0875 |
| 2018/0211067 | A1* | 7/2018 | Costa | H04L 9/3263 |

FOREIGN PATENT DOCUMENTS

| | | |
|---|---|---|
| JP | 2012-199721 A | 10/2012 |
| JP | 2013-055511 A | 3/2013 |
| JP | 2014-106854 | 6/2014 |
| WO | 2013/031124 A1 | 3/2013 |

OTHER PUBLICATIONS

Federal Information Processing Standards Publication 186-4, "Digital Signature Standard (DSS)," National Institute of Standards and Technology (NIST), Jul. 2013.

\* cited by examiner

VERIFICATION METHOD, VERIFICATION APPARATUS, AND STORAGE MEDIUM INCLUDING PROGRAM STORED THEREIN

CROSS REFERENCE TO RELATED APPLICATION

This is a continuation application of U.S. patent application Ser. No. 17/101,876, filed on Nov. 23, 2020, which is a continuation of U.S. patent application Ser. No. 16/264,804, now U.S. Pat. No. 10,887,111 B2, filed on Feb. 1, 2019, which is a continuation of International Application No. PCT/JP2018/004973, filed on Feb. 14, 2018, and which claims the benefit of Japanese Patent Application No. 2017-096225, filed on May 15, 2017, and Japanese Patent Application No. 2018-009147, filed on Jan. 23, 2018. The disclosure of each of the above-identified applications, including the specification, drawings, and claims, is incorporated herein by reference in its entirety.

BACKGROUND

1. Technical Field

The present disclosure relates to a verification method for verifying content data, a verification apparatus, and a storage medium including a program stored therein.

2. Description of the Related Art

In recent years, a technique known as an autonomous driving system has been used to control driving an autonomous vehicle. In the autonomous driving system, it is assumed that high-level map data on which the control is based and information regarding a vehicle, a pedestrian, and an infrastructure are acquired via a communication with an apparatus located outside the autonomous vehicle. For example, information is acquired via a V2X (Vehicle-to-Everything) communication such as an inter-vehicle communication, a road-to-vehicle communication, or the like, or information is acquired via other various communications including a communication with an information terminal. The autonomous vehicle is controlled based on the information acquired in the above-described manner taking into account other information in terms of a running state of the vehicle, a situation around the vehicle and a state of a driver.

Japanese Unexamined Patent Application Publication No. 2014-106854 discloses a technique in which, to enhance the safety of autonomous driving control of a vehicle, in a case where it is determined that an autonomous driving control apparatus of the vehicle does not satisfy a condition for autonomous driving, a driver is prompted to release autonomous driving.

SUMMARY

In a case where an autonomous driving system acquires data from an apparatus located outside a vehicle, there may be a risk that a cyber attack will be received such as a transmission of invalid data from an unauthorized spoofing terminal.

In a conventional technique of verifying content data, when large size content data such as map data is downloaded, it takes a long time to verify the whole content data. Therefore, in a system in which it is assumed that downloaded content data or the like becomes usable after the verification is completed for the whole content data, the system has a problem that it is impossible to use content data in real time in autonomous driving of a vehicle.

One non-limiting and exemplary embodiment provides a more effective verification method of verifying content for in use in autonomous driving of a vehicle.

In one general aspect, the techniques disclosed here feature a verification method for verifying content data to be used in a vehicle, the method including: acquiring the content data; acquiring, from a plurality of pieces of partial data obtained by dividing the content data, a respective plurality of first hash values; acquiring a signature generated by using the plurality of first hash values and a key; acquiring state information that indicates a state of the vehicle; determining an integer N that is greater than or equal to one based on the acquired state information; generating, from N pieces of partial data included in the plurality of pieces of partial data, a respective set of second hash values; verifying the content data by using each of (a) a subset of the plurality of first hash values which are those respectively generated from partial data other than the N pieces of partial data, (b) the generated second hash values, and (c) the acquired signature, and outputting information that indicates a result of the verifying.

According to the present disclosure, it is possible to verify a content for use in autonomous driving of a vehicle by using a more optimum content verification method.

It should be noted that general or specific embodiments may be implemented as a system, an apparatus, an integrated circuit, a computer program, a computer-readable storage such as a CD-ROM disk, or any selective combination of a system, an apparatus, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
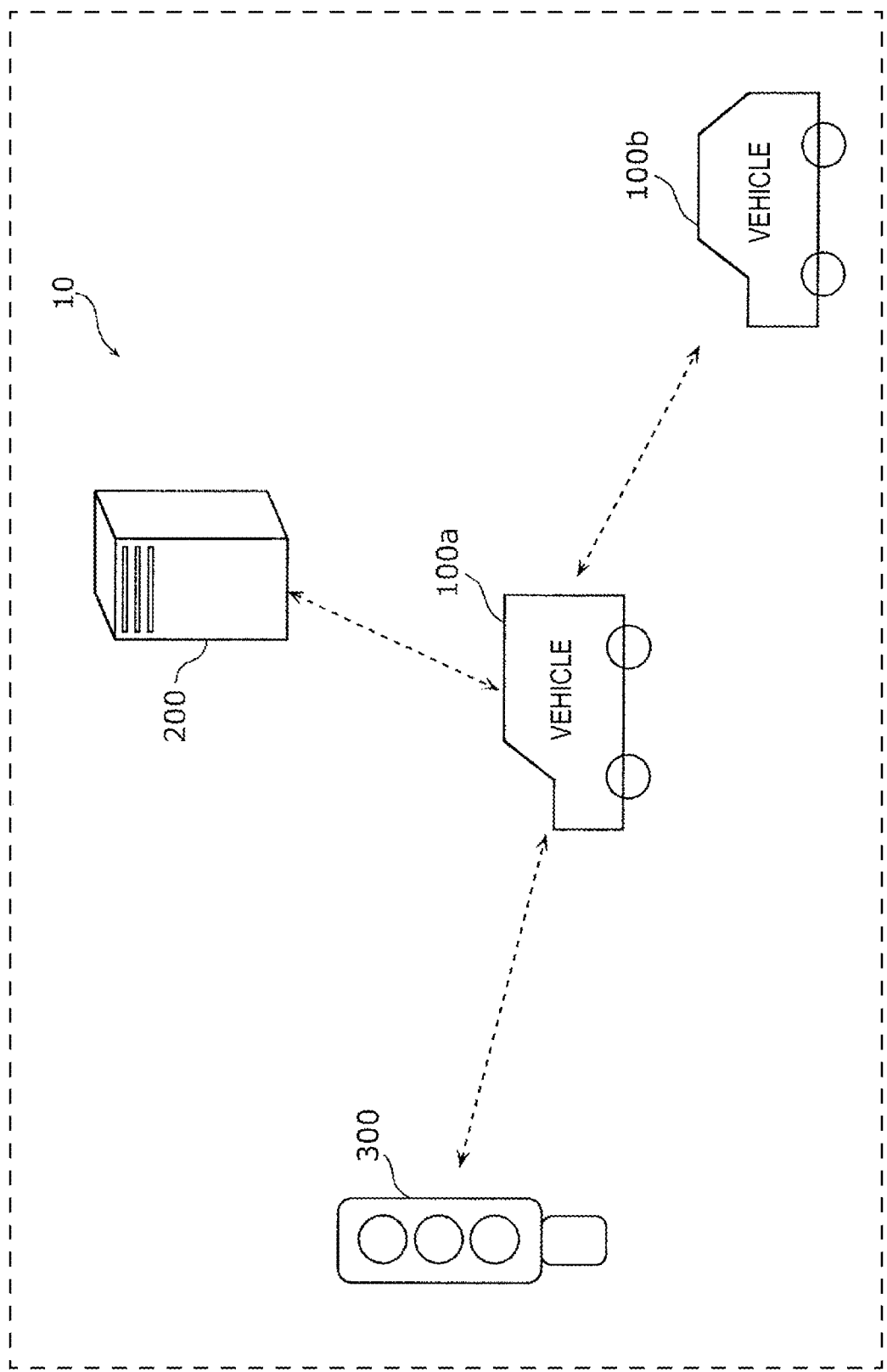
FIG. 1 is a schematic diagram illustrating an overall configuration of a content verification system according to an embodiment.

According to an aspect, the present disclosure provides a verification method for verifying content data to be used in a vehicle, including acquiring the content data, acquiring, from a plurality of pieces of partial data obtained by dividing the content data, a respective plurality of first hash values, acquiring a signature generated by using the plurality of first hash values and a key, acquiring state information that indicates a state of the vehicle, determining an integer N that is greater than or equal to one based on the acquired state information, generating, from N pieces of partial data included in the plurality of pieces of partial data, a respective set of second hash values, verifying the content data by using each of (a) a subset of the plurality of first hash values which are those respectively generated from partial data other than the N pieces of partial data, (b) the generated second hash values, and (c) the acquired signature, and outputting information that indicates a result of the verifying. The key may be a secret key.

In the aspect described above, when a verification apparatus verifies large-size content data including map information or the like, part of the content data is selected depending on a state of a vehicle and the selected part of the content data is used in the verification. This makes it possible to quickly verify the content data while maintaining a practical security level, and thus it becomes possible to build a secure system.

An attacker does not have a secret key, and thus it is difficult for the attacker to generate a valid digital signature (also referred to simply as a signature). Therefore, the verification apparatus is capable of verifying whether content data is valid or not, using a signature included in verification data for verifying the content data. That is, it is possible to detect an alteration of content data made by an attacker. The above-described ability of the verification apparatus to verify whether content data is valid or not makes it possible to build a secure system in which detected invalid content data is discarded and only valid content data is used in an autonomous driving operation of a vehicle or other operations. As described above, the verification apparatus is capable of verifying a content for use in autonomous driving of the vehicle by using the more optimum content verification method.

For example, in the generating, the N pieces of partial data may be randomly selected from the plurality of pieces of partial data, and a respective second hash value may be generated from each of the selected N pieces of partial data.

In the aspect, when the verification apparatus verifies large-size content data including map information or the like, part of the content data is selected randomly and the verification is performed on the selected part of the content data. This makes it possible to perform quick verification while maintaining practical security level, and thus it becomes possible to build a secure system.

In this case, the verification of the content data in the vehicle is performed such that the content data is divided into a plurality of pieces of partial data, and the verification is performed on a particular number of pieces of partial data randomly selected from the whole pieces of partial data. In a case where an attacker attacks the system such that the content data is tampered with, there is a high probability that the selected pieces of partial content data include an alteration made by the attacker. Therefore, the verification apparatus is capable of more effectively verifying whether the content data is valid or not, which makes it possible to achieve higher security in the system.

In this case, a change always occurs in terms of which pieces of partial data for use in the verification are selected from the plurality of pieces of partial data, and this makes it possible to more effectively detect malicious data such as spoofing data. Therefore, the verification apparatus is capable of verifying a content in use of autonomous driving of the vehicle using a more optimum content verification method.

For example, the state information may indicate whether the vehicle is running or not running, and in the determining, when the vehicle is determined to be running, a value of N may be determined so as to be equal to a first value, and when the vehicle is determined to be not running, the value of N may be determined so as to be equal to a second value that is greater than the first value.

In the verification apparatus according to the above-described aspect, in a case where it is allowed to take a relatively long time to perform verification, it is allowed to verify content data in more detail, while in a case where it is allowed to take only a relatively short time to perform verification, the verification is ended in the short time such that the content data is made usable. Thus, the verification apparatus is capable of verifying a content in use in autonomous driving of the vehicle using the verification method optimized depending on the length of the time available for the verification.

For example, the state information may indicate, as the state of the vehicle, a processing load imposed on an apparatus that executes the verification method, and in the determining, a value of N may be determined such that the higher the processing load is, the smaller the value of N is.

According to the aspect described above, in a case where a relatively high processing power is available to perform the verification, the verification apparatus verifies the content data in more detail, while in a case where a relatively low processing power is available to perform the verification, the verification apparatus completes the verification of the content data in a brief manner thereby making the content data usable. Thus, the verification apparatus is capable of verifying a content in use in autonomous driving of the vehicle using the verification method optimized depending on the processing power available for the verification.

For example, the state information may indicate, as the state of the vehicle, an amount of communication data included in a communication performed by an apparatus that executes the verification method, and in the determining, a value of N may be determined such that the greater the amount of communication data is, the smaller the value of N is.

According to the aspect described above, in a case where the amount-of-communication information indicates that a relatively high processing power is available to perform the verification, the verification apparatus verifies the content data in more detail, while in a case where a relatively low processing power is available to perform the verification, the verification apparatus completes the verification of the content data in a brief manner thereby making the content data usable. Thus, the verification apparatus is capable of verifying a content in use in autonomous driving of the vehicle using the verification method optimized depending on the processing power available for the verification.

For example, in the determining, a value of N may be determined such that the greater the amount of communication data is, the smaller the value of N is.

According to the aspect described above, the verification apparatus is capable of verifying the content data by using an optimum number of pieces of partial data based on the type or the size of the content data. Thus, the verification apparatus is capable of verifying a content in use in autonomous driving of the vehicle using the content verification method optimized depending on the type or the size of the content data.

For example, in the determining, based on a type of the content data, a determination may be made as to which pieces of the plurality pieces of partial data are selected as the N pieces of partial data.

According to the aspect described above, in a case where it is known what kind of contents are included in the respective pieces of partial data depending on the type of the content data, the verification apparatus is capable of selecting particular pieces of partial data which are more necessary to be subjected to the verification and performing the verification on the selected pieces of partial data. Thus, the verification apparatus is capable of verifying a content, in use in autonomous driving of the vehicle, using the content verification method optimized such that particular pieces of partial data more necessary to be verified are subjected to the verification.

For example, the type of the content data may include a measure that indicates an update interval of the content data.

In the verification apparatus according to the aspect described above, the type of the content is indicated by the update interval of the content data, which makes it possible to verify the content, in use in autonomous driving of the vehicle, using the optimized content verification method.

According to an aspect, the present disclosure provides a verification apparatus that verifies content data to be used in a vehicle, including a processor and a memory connected to the processor, the processor executing, using the memory, a process including acquiring the content data, acquiring, from a plurality of pieces of partial data obtained by dividing the content data, a respective plurality of first has values, and acquiring a signature generated by using the plurality of first hash values and a key, acquiring state information that indicate a state of the vehicle, determining an integer N that is greater than or equal to one based on the acquired state information, and generating, from N pieces of partial data included in the plurality of pieces of partial data, respective second hash values, verifying the content data by using each of (a) a subset of the plurality of first hash values which are those respectively generated from partial data other than the N pieces of partial data, (b) the generated second hash values, and (c) the signature, and outputting information that indicates a result of the verifying. The key may be a secret key.

This aspect provides advantageous effects similar to those provided by the verification apparatus according to any previous aspect.

It should be noted that general or specific embodiments may be implemented as a system, an apparatus, an integrated circuit, a computer program, a computer-readable storage such as a CD-ROM disk, or any selective combination of a system, an apparatus, an integrated circuit, a computer program, and a storage medium.

Embodiments are described in detail below with reference to drawings.

Note that any embodiment described below is provided to illustrate a general or specific example. In the following embodiments, values, shapes, materials, constituent elements, locations of elements, manners of connecting elements, steps, the order of steps, and the like are described by way of example but not limitation. Among constituent elements described in the following embodiments, those constituent elements that are not described in independent claims indicating highest-level concepts of the present disclosure are optional.

EMBODIMENTS

1. System Configuration

In embodiments described below with reference to drawings, a gateway installed on an in-vehicle network functions as a verification apparatus which verifies content data received from an apparatus, such as a server or a traffic signal, located outside a vehicle via V2X.

1.1 Overall Configuration of Content Verification System 10

FIG. 1 is a schematic diagram illustrating an overall configuration of a content verification system 10 according to an embodiment. In FIG. 1, the content verification system 10 includes vehicles 100a and 100b, a server 200, and a traffic signal 300. In FIG. 1, the content verification system 10 includes vehicles 100a and 100b, a server 200, and a traffic signal 300. The vehicles 100a and 100b, the server 200, and the traffic signal 300 are connected to each other via a network or a communication link such that they are capable of communicating with each other.

In the content verification system 10, not only the traffic signal 300 but other elements such as a floodlight, an information bulletin board/sign, a bridge, a sensor installed on an infrastructure such as a tunnel, a pedestrian bridge, or the like, a camera, a GPS (Global Positioning System) receiver, and/or the like may be connected via a network or a communication link.

1.2 Configuration of Vehicle 100a

Figure 2:
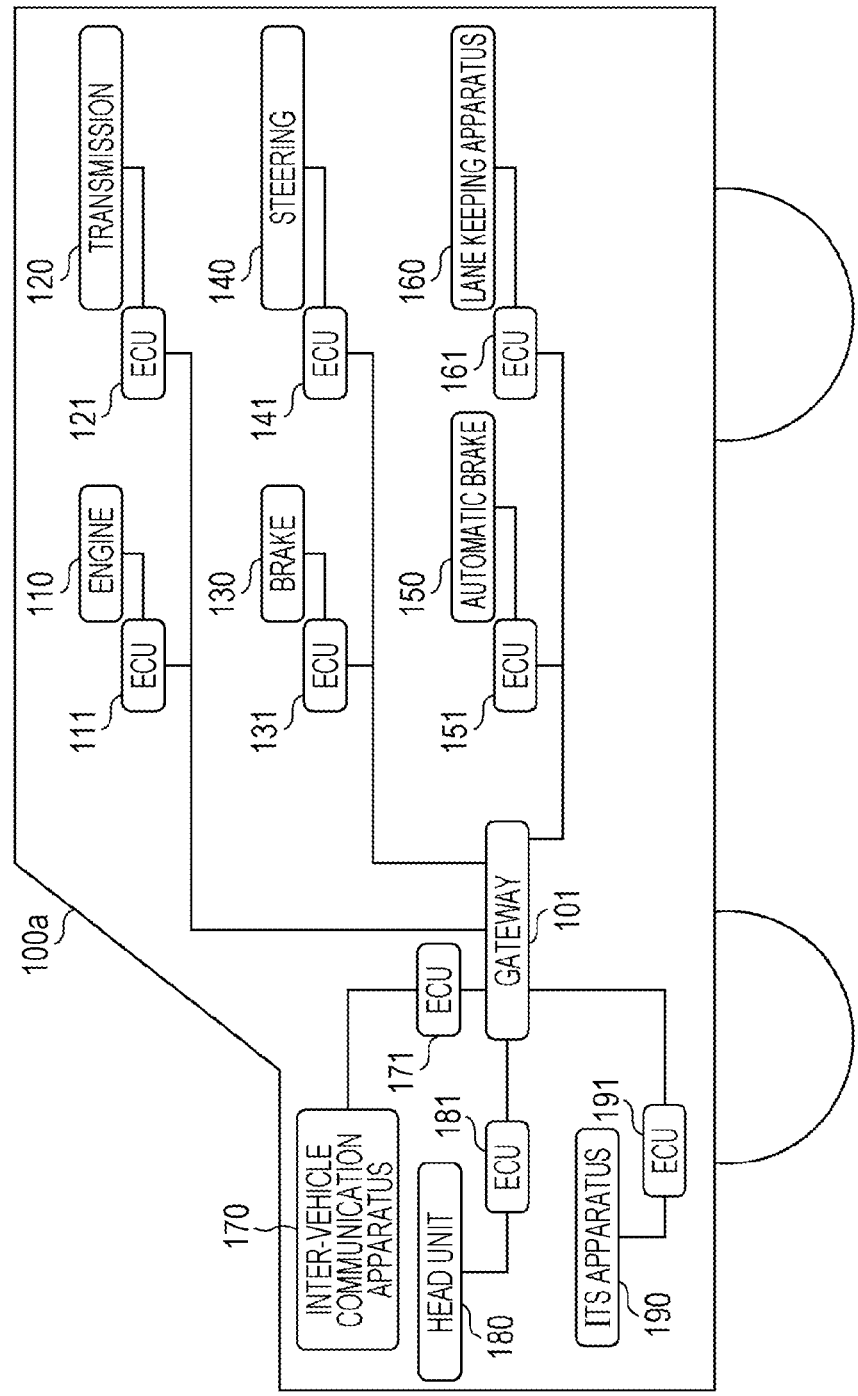
FIG. 2 is a schematic diagram illustrating a functional configuration of a vehicle according to an embodiment.

FIG. 2 is a schematic diagram illustrating an overall configuration of the vehicle 100a according to the present embodiment. In FIG. 2, a plurality of electronic control units (ECUs) ECU 111, ECU 121, ECU 131, ECU 141, ECU 151, ECU 161, ECU 171, ECU 181, and ECU 191 are connected to a gateway 101 via an in-vehicle network. The in-vehicle network may be a Controller Area Network (hereafter referred to as CAN) or Ethernet (registered trademark), or a combination of CAN and Ethernet (registered trademark).

The in-vehicle network is connected to driving-related ECUs that control, for example, the engine 110, the transmission 120, a motor (not illustrated), a fuel (not illustrated), or a battery (not illustrated). In FIG. 2, an ECU 111 for the engine 110 and an ECU 121 for the transmission 120 are connected, as driving ECUs, to the in-vehicle network.

Furthermore, the in-vehicle network is also connected to chassis-related ECUs that provide functions of "turning or stopping" the vehicle using the brake 130 or the steering 140. In FIG. 2, an ECU 131 for the brake 130 and an ECU 141 for the steering 140 are connected, as chassis ECUs, to the in-vehicle network.

Furthermore, the in-vehicle network is also connected to safety/comfort-related ECUs for an automatic brake 150, lane keeping apparatus 160, an inter-vehicle distance control function (not illustrated), a collision avoidance function or an airbag. In FIG. 2, an ECU 151 for the automatic brake 150 and an ECU 161 for the lane keeping apparatus 160 are connected, as safety/comfort-related ECUs, to the in-vehicle network.

Furthermore, the in-vehicle network is also connected to a communication-related ECU for an inter-vehicle communication apparatus 170 or the like. In FIG. 2, an ECU 171 for the inter-vehicle communication apparatus 170 is connected, as a communication-related ECU, to the in-vehicle network. The inter-vehicle communication apparatus 170 acquires content data from another vehicle. The ECU 171 performs an operation process such as an autonomous driving operation using the acquired content data.

Furthermore, the in-vehicle network is also connected to an infortainment-related ECU for a head unit 180 or the like. In FIG. 2, an ECU 181 for the head unit 180 is connected, as an infortainment-related ECU, to the in-vehicle network. Note that the ECU 181 for the head unit 180 may be removed, and the head unit 180 may be directly connected to the in-vehicle network without passing through the ECU 181.

Furthermore, the in-vehicle network is also connected to an ECU 191 for an ITS (Intelligent Transport Systems) apparatus 190. In FIG. 2, an ECU 191 for the ITS apparatus 190 is connected to the in-vehicle network. The ITS apparatus 190 receives, from the server 200, road surface information, map information, or the like stored in the server 200. The ITS apparatus 190 transmits sensor information, GPS position information, camera image information, or the like to the server 200. The server 200 can grasp a road condition or the like from the image information transmitted from the ITS apparatus 190.

Note that various sensors (not illustrated) or image information captured by a camera are also connected to the in-vehicle network.

The gateway 101 is a relay apparatus that is connected to each ECU described above and functions to relay communication between ECUs. The ECUs are connected to each other via the gateway 101 such that it is allowed to transmit information between each other.

The server 200 is a server apparatus which has various kinds of content data and performs various kinds of information processing. The server 200 has, as content data, map information, road surface information, traffic restriction information, accident information, pedestrian information, or the like. The map information is information indicating static features of roads, buildings, and/or the like. The traffic restriction information is information indicating a location, time zone, or the like where a traffic restriction is imposed because of a weather or an accident. The accident information is information indicating a time, a location, or the like where an accident is happening. The pedestrian information is information indicating a time, a location, or the like whether a pedestrian exists. The server 200 is connected to the vehicle 100*a* via a communication line such that a communication between them is possible, and the server 200 provides various pieces of information stored therein to the vehicle 100*a* or the like.

As for the content data stored in the server 200, some is updated at relatively long intervals, and some is updated at relatively short intervals. For example, the map information, the road surface information, and the like are updated at intervals of a few months. On the other hand, the accident information, the traffic restriction information, and the like are updated at intervals of a few minutes to a few hours. The server 200 may store a measure indicating an update interval of content data such that the measure is stored in association with the corresponding content data. The measure indicating the update interval may be represented in terms of a length of time (one month, one hour, one minute, one second, or the like) of the update interval, or may indicate a degree of the update interval represented, for example, in three levels (long, middle, short).

The traffic signal 300 is a traffic signal. The traffic signal 300 communicates with the vehicle 100*a* or the like via radio wave communication, visible light communication, or the like.

1.3 Configuration of Gateway 101

Figure 3:
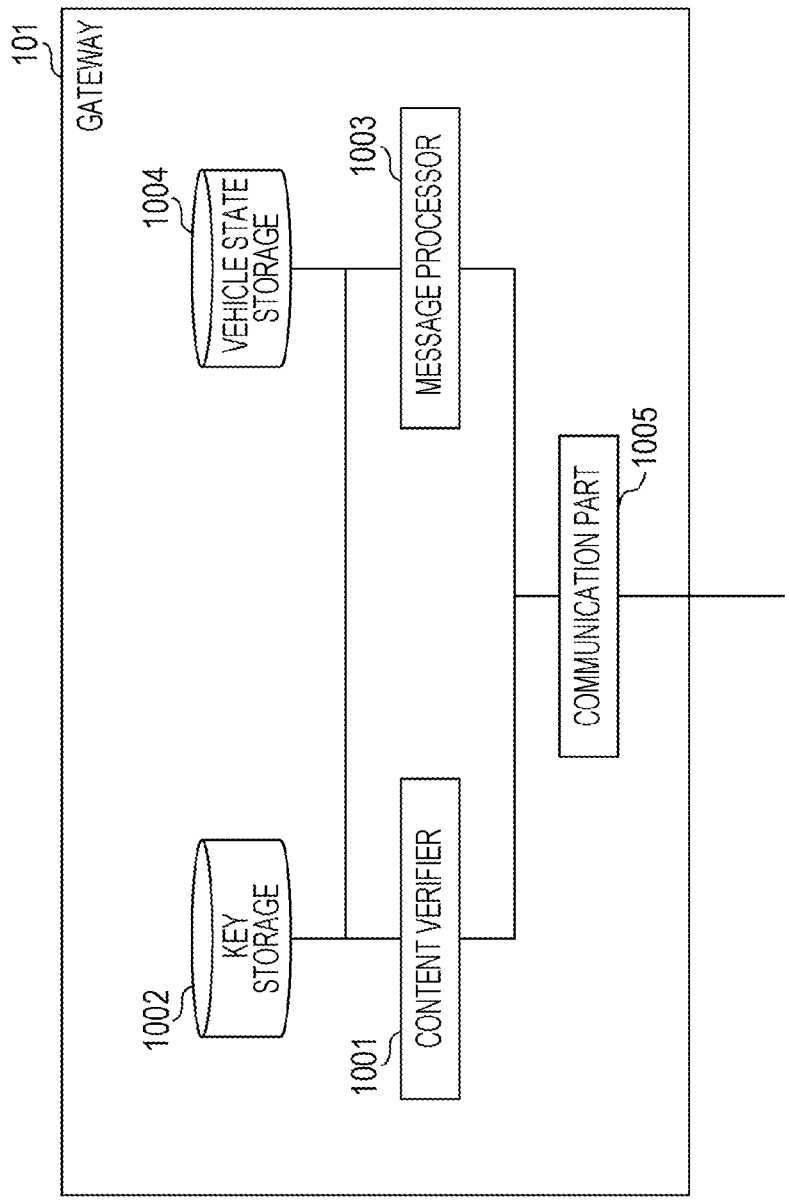
FIG. 3 is a schematic diagram illustrating a functional configuration of a gateway according to an embodiment.

FIG. 3 is a diagram illustrating a configuration of the gateway 101 according to the present embodiment. In FIG. 3, the gateway 101 includes a content verifier 1001, a key storage 1002, a message processor 1003, a vehicle state storage 1004, and a communication part 1005. The gateway 101 includes at least a processor (not illustrated) and a memory connected to the processor, and functions described below are realized by executing a particular program by the processor using the memory.

The communication part 1005 is a communication interface that performs a communication process on a message transmitted in the in-vehicle network. When the communication part 1005 receives a message, the communication part 1005 transmits the received message to the message processor 1003 or the content verifier 1001. The communication part 1005 also transfers a message received from an arbitrary bus in the in-vehicle network to another bus.

The content verifier 1001 verifies vehicle-oriented content data received via a network outside the vehicle such as ITS or inter-vehicle communication.

More specifically, the content verifier 1001 acquires content data, a plurality of first hash values respectively generated from a plurality of pieces of partial data obtained by dividing the content data, and a signature generated using the plurality of first hash values and a secret key. The content verifier 1001 acquires state information indicating a state of the vehicle 100*a*. The content verifier 1001 generates a second hash value from each of a particular number of pieces of partial data selected from the plurality of partial data where the particular number is determined depending on the acquired state information. The particular number is an integer greater than or equal to 1. The content verifier 1001 verifies the acquired content data using the generated second hash values, first hash values respectively generated from pieces of partial data other than the particular number of pieces of partial data in the plurality of pieces of partial data, and the signature, and the content verifier 1001 outputs information indicating a result of the verification.

The verification process on the content data by the content verifier 1001 will be described in further detail later.

The key storage 1002 stores a key used by the content verifier 1001 or the message processor 1003. More specifically, the key storage 1002 stores a key (that is, a public key provided by the server 200) for use by the content verifier 1001 in verifying a content received from the server 200. In a case where the in-vehicle network includes a CAN network, the key storage 1002 stores a key (a MAC key) used in verifying a MAC (Message Authentication Code) code used in a CAN message. In a case where the in-vehicle network includes an Ethernet (registered trademark) network, the content verifier 1001 stores a communication key used in an encrypted communication or the like in the Ethernet (registered trademark) network.

The message processor 1003 processes a message. For example, the message processor 1003 transfers a message on an arbitrary bus of the in-vehicle network to another bus. The message processor 1003 also verifies a message. In the verification of a message, the message processor 1003 uses a verification key such as a MAC key stored in the key storage 1002.

Furthermore, the message processor 1003 acquires state information indicating a state of the vehicle from a message and stores the state information in the vehicle state storage 1004. For example, the state information includes running state information indicating whether the vehicle 100*a* is in a running state, a stopped state, or a parked state. Information indicating whether the vehicle 100*a* is in the running state or the like can be obtained from information associated with the transmission 120 or from the speed information. The state information may include load information indicating a processing load imposed on the gateway 101 which is an apparatus that executes the process and/or amount-of-communication information indicating an amount of communication data in communication performed by the gateway 101.

The speed information may be acquired from an ECU that acquires information about a number of revolutions of tire (not illustrated), the ECU 111 connected to the engine 110, or the ECU 131 connected to the brake 130.

The vehicle state storage 1004 is a storage apparatus that stores a state of the vehicle. In the vehicle state storage 1004, the state information acquired by the message processor 1003 is stored. The state information stored in the vehicle state storage 1004 is read by the content verifier 1001.

1.4 Configuration of Server 200

Figure 4:
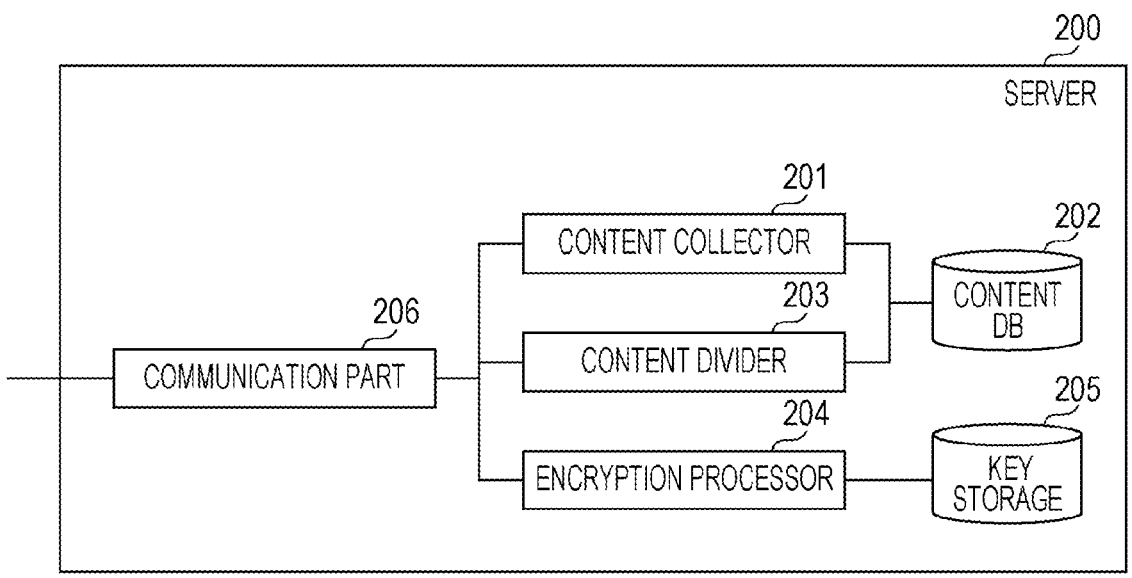
FIG. 4 is a schematic diagram illustrating a functional configuration of a server according to an embodiment.

FIG. 4 is a schematic diagram illustrating a functional configuration of the server 200 according to the present embodiment. In FIG. 4, the server 200 includes a content collector 201, a content DB 202, a content divider 203, an encryption processor 204, a key storage 205, and a communication part 206. The server 200 includes at least a processor (not illustrated) and a memory connected to the processor, and functions described below are realized by executing a particular program by the processor using the memory.

The communication part 206 is a communication interface that communicates with the vehicle 100*a* or 100*b* or the traffic signal 300. The communication part 206 may use TLS (Transport Layer Security) as a communication protocol.

The content collector 201 collects content data acquired from the vehicle 100*a* or 100*b* or the traffic signal 300. The content data includes sensor information acquired from the vehicle 100*a* or 100*b* or the traffic signal 300, position information indicating a position of the vehicle 100*a* or 100*b* acquired from a GPS or the like, image information acquired from a camera, and/or the like. From the content data, a road condition is acquired in terms of an accident, congestion, or the like. The content collector 201 may acquire, together with the content data, a measure indicating an update interval at which the content data is to be updated.

The content DB 202 is a storage apparatus in which content data is stored. In the content DB 202, the content data collected by the content collector 201 is stored. The content DB 202 also stores map data. The content data stored in the content DB 202 is read by the content divider 203.

The content divider 203 reads content data relating to a road condition around the vehicle 100*a* from the content data stored in the content DB 202, and divides the read content data. In the reading of the content data relating to the road condition around the vehicle 100*a*, content data relating to an area in the vicinity of the position indicated by separately-acquired position information of the vehicle 100*a* is read from the content data stored in the content DB 202. The content divider 203 then transmits the divided content data to the encryption processor 204. Each piece of divided content data is also referred to as partial data.

The dividing of the content data by the content divider 203 may be performed in various manners. For example, regarding a division size, the dividing may be performed such that each piece of divided partial data has an equal fixed size, or such that the size of the divided partial data may be changed depending on the type of the content data.

The key storage 205 stores a secret key (a secret key provided by the server 200) used in generating verification data for verifying content data.

The encryption processor 204 generates verification data for verifying the content data, using the secret key stored in the key storage 205. The method of generating the data for verification by the encryption processor 204 will be described later.

The server 200 may be disposed at any physical location as long as the server 200 is connected to the Internet. The server 200 may be realized by a so-called cloud server. The content data provided by the server 200 can be said to be content data generated by the cloud.

1.5 Configuration of Traffic Signal 300

Figure 5:
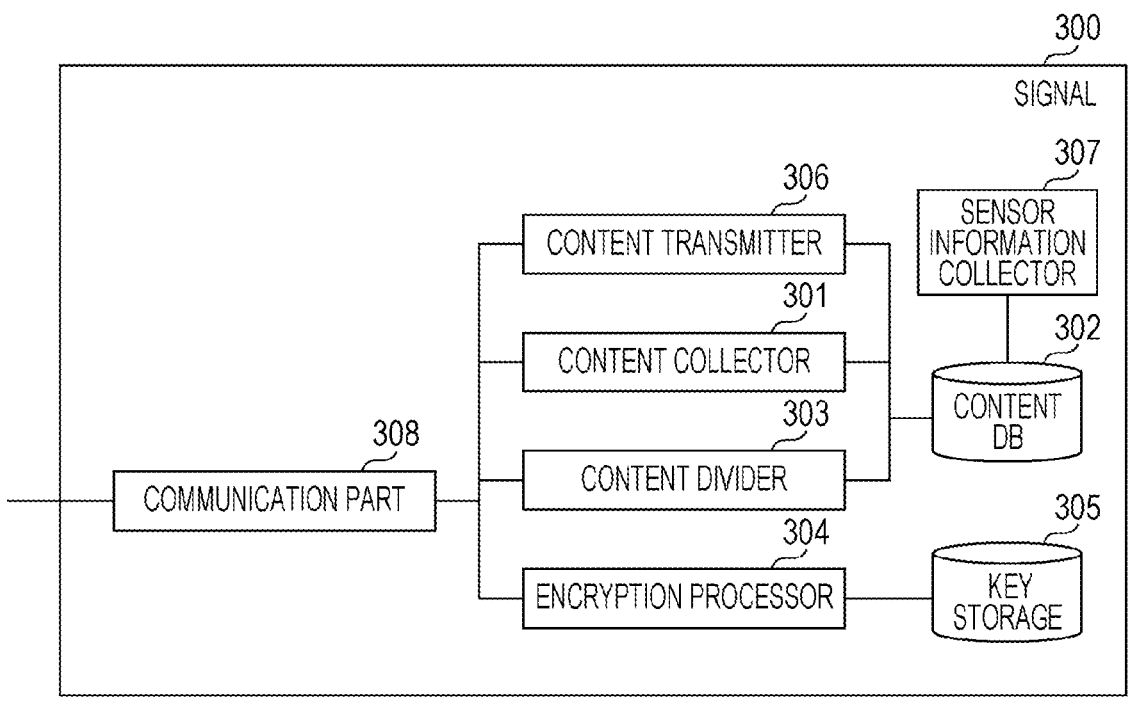
FIG. 5 is a schematic diagram illustrating a functional configuration of a traffic signal according to an embodiment.

FIG. 5 is a schematic diagram illustrating a functional configuration of the traffic signal 300 according to the present embodiment. In FIG. 5, the traffic signal 300 includes a content collector 301, a content DB 302, a content divider 303, an encryption processor 304, a key storage 305, a content transmitter 306, a sensor information collector 307, and a communication part 308. The traffic signal 300 includes at least a processor (not illustrated) and a memory connected to the processor, and functions described below are realized by executing a particular program by the processor using the memory. Note that in addition to the functions described below, the traffic signal 300 also has a function of a traffic signal.

The content DB 302 has a similar configuration to that of the content DB 202, the content divider 303 has a similar configuration to that of the content divider 203, the encryption processor 304 has a similar configuration to that of the encryption processor 204, and the key storage 305 has a similar configuration to that of the key storage 205, and thus a description of the configuration thereof is omitted.

The content collector 301 stores, in the content DB 302, sensor information acquired from the vehicle 100*a* or 100*b* via V2X.

The content transmitter 306 transmits the content data stored in the content DB 302 to the server 200.

The sensor information collector 307 acquires sensor information generated by a sensor (not illustrated) installed on the traffic signal 300 or image information generated by a camera (not illustrated) and stores the acquired information in the content DB 302.

The communication part 308 is a communication interface that communicates with the server 200 and also communicates with the vehicle 100*a* or 100*b* via V2X.

1.6 Communication Sequence Between Vehicle 100*a* and Server 200

Figure 6:
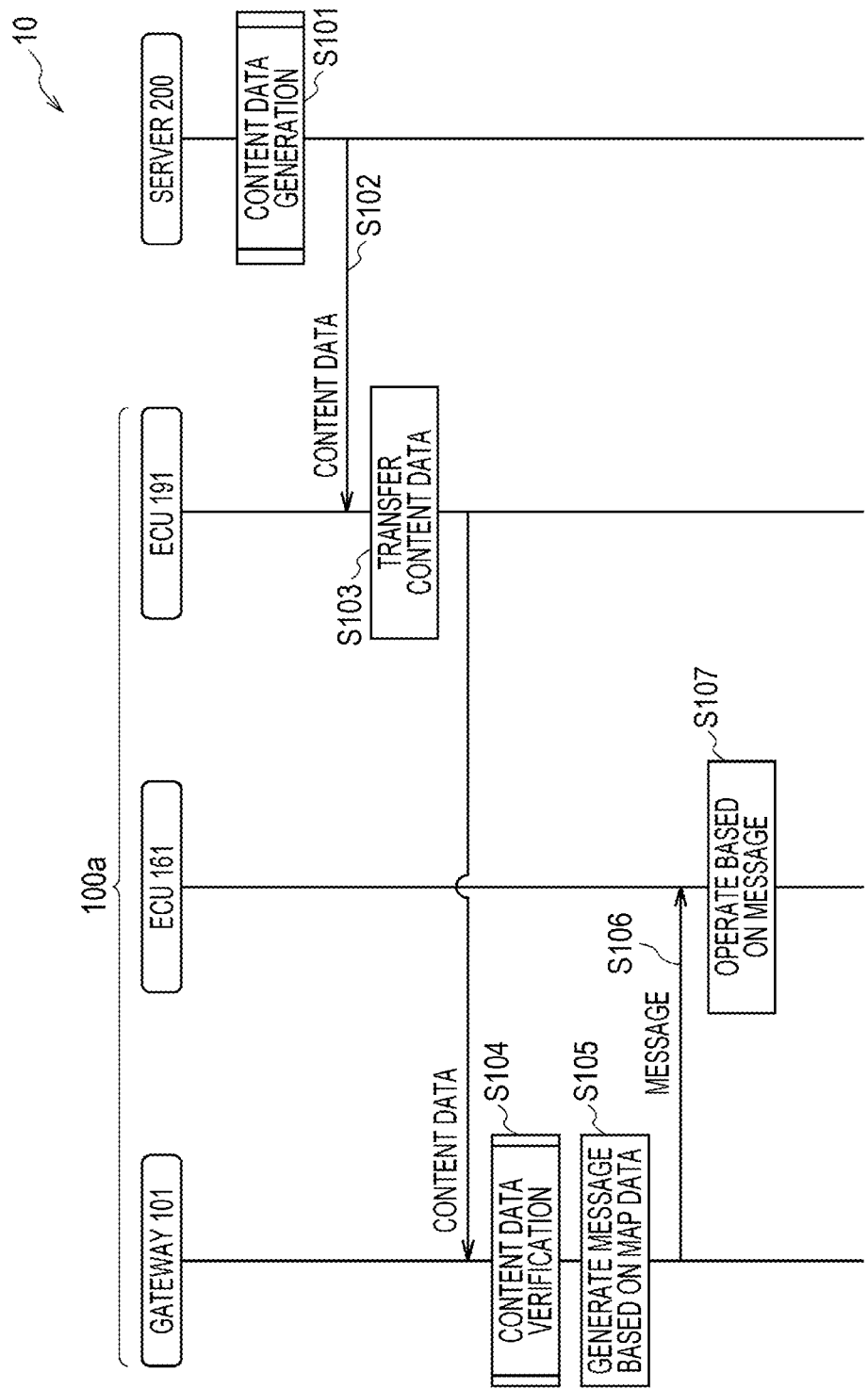
FIG. 6 is a sequence diagram illustrating a process of downloading content data from a server to a vehicle according to an embodiment.

Next, an explanation is given below about communication between the vehicle 100*a* and the server 200, and more specifically, about a process including downloading content data from the server 200 to the vehicle 100*a* and verifying the content data at the vehicle 100*a*. In the present embodiment, by way of example, the vehicle 100*a* downloads content data such as map data from the server 200, and uses the downloaded content data in a lane keeping function. Communication sequence in downloading content data FIG. 6 is a sequence diagram illustrating a process of downloading content data from the server 200 to the vehicle 100a according to the present embodiment. In the sequence shown in FIG. 6, the vehicle 100a downloads content data from the server 200 and verifies the downloaded content data.

In step S101, the server 200 generates content data.

In step S102, the server 200 transmits the content data to the vehicle 100a.

In step S103, the ITS apparatus 190 of the vehicle 100a downloads the content data transmitted from the server 200 and transmits the content data to the ECU 191 for the ITS apparatus 190. The ECU 191 for the ITS apparatus 190 transmits the received content data to the gateway 101 thereby transferring it.

In step S104, the gateway 101 executes a verification on the received content data.

In a case where it is determined in the verification in step S104 that the received content data is valid, then in step S105, the gateway 101 generates a message associated with the received content data.

In step S106, the gateway 101 transmits the message generated in step S105 to the ECU 161 for the lane keeping apparatus 160.

In step S107, the ECU 161 for the lane keeping apparatus 160 executes an operation associated with the lane keeping function based on the message received from the gateway 101.

Generating Content Data (Step S101)

Figure 7:
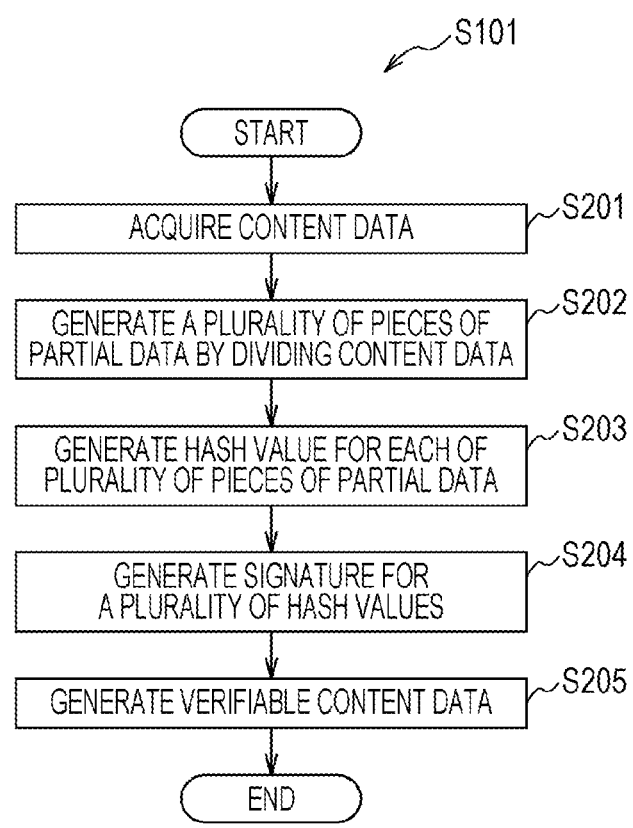
FIG. 7 is a flow chart illustrating a process of generating content data by a server according to an embodiment.

FIG. 7 is a flow chart illustrating a process of generating content data by the server 200 according to the present embodiment. Note that the flow chart in FIG. 7 is a further detailed description of step S101 shown in FIG. 6.

In step S201, the content divider 203 of the server 200 acquires, from the content DB 202, content data which is suitable to be transmitted to the vehicle 100a. Note that the content data acquired in step S201 is also referred to as main content data in order to distinguish from "verifiable content data" will be described data.

In step S202, the content divider 203 of the server 200 divides the content data acquired in step S201 into a plurality of pieces of partial data.

In step S203, the encryption processor 204 of the server 200 generates a hash value for each of the plurality of pieces of partial data generated via the dividing in step S202 thereby generating a plurality of hash value. A hash function to use to generate hash values is determined in advance in the content verification system 10. For example, SHA-256 is used as the hash function.

In step S204, the encryption processor 204 of the server 200 generates a signature for each of the plurality of hash values generated in step S203 using a secret key stored in the key storage 205. In the generation of the signature, for example, ECDSA (Elliptic Curve Digital Signature Algorithm) disclosed in "Federal Information Processing Standards Publication 1 86-4 DIGITAL SIGNATURE STANDARD (DSS)", July, 2013, National Institute of Standards and Technology (NIST) may be used.

In step S205, the encryption processor 204 of the server 200 generates verifiable content data including the partial data generated in step S202, the hash values generated in step S203, and the signatures generated in step S204. The generating of the verifiable content data is described in further detail below with reference to FIG. 8.

Figure 8:
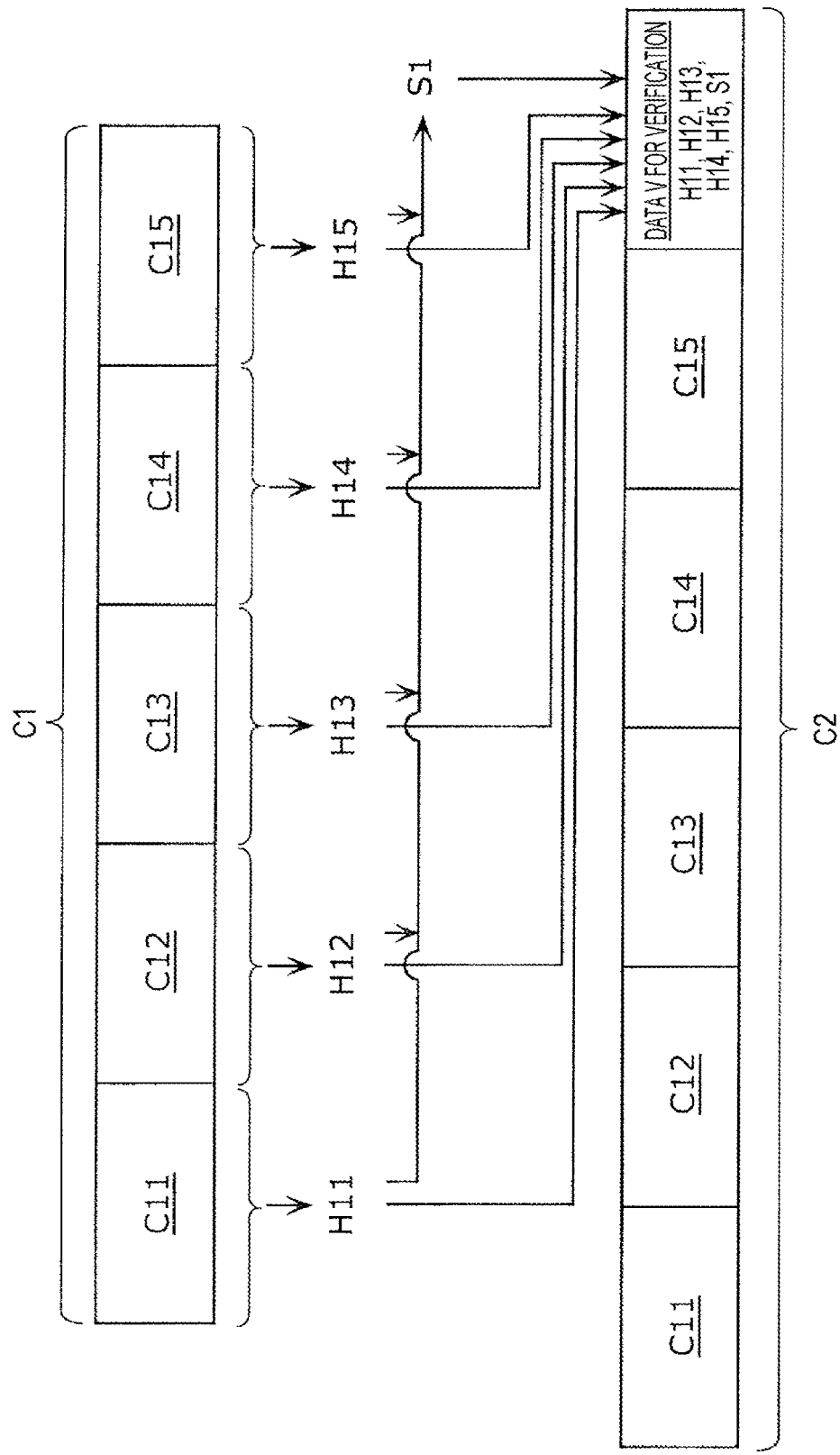
FIG. 8 is schematic diagram illustrating a process of generating verifiable content data according to an embodiment.

FIG. 8 is a diagram illustrating a process of generating verifiable content data according to the present embodiment. More specifically, the process in S202 to S205 described above are explained.

As shown in FIG. 8, the encryption processor 204 divides content data C1 into five pieces of partial data C11, C12, C13, C14, and C15 (step S202).

Next, the encryption processor 204 generates a hash value for each of the generated pieces of partial data C11, C12, C13, C14, and C15. More specifically, the encryption processor 204 generates a hash value H11 for the partial data C11, generates a hash value H12 for the partial data C12, generates a hash value H13 for the partial data C13, generates a hash value H14 for the partial data C14, and generates a hash value H15 for the partial data C15 (step S203). Note that the hash values H11, H12, H13, H14, and H15 will be also referred to as first hash values.

Next, the encryption processor 204 combines the generated hash values H11, H12, H13, H14, and H15, and generates a signature S1 using a secret key of the server 200 stored in the key storage 205 (step S204).

Next, the encryption processor 204 adds the hash values H11, H12, H13, H14, and H15, and the signature S1, as data for verification V, to the content data C1 thereby generating verifiable content data C2 (step S205). That is, the verifiable content data C2 includes the content data C1 and the data for verification V.

Verifying Content Data (Step S104)

Figure 9:
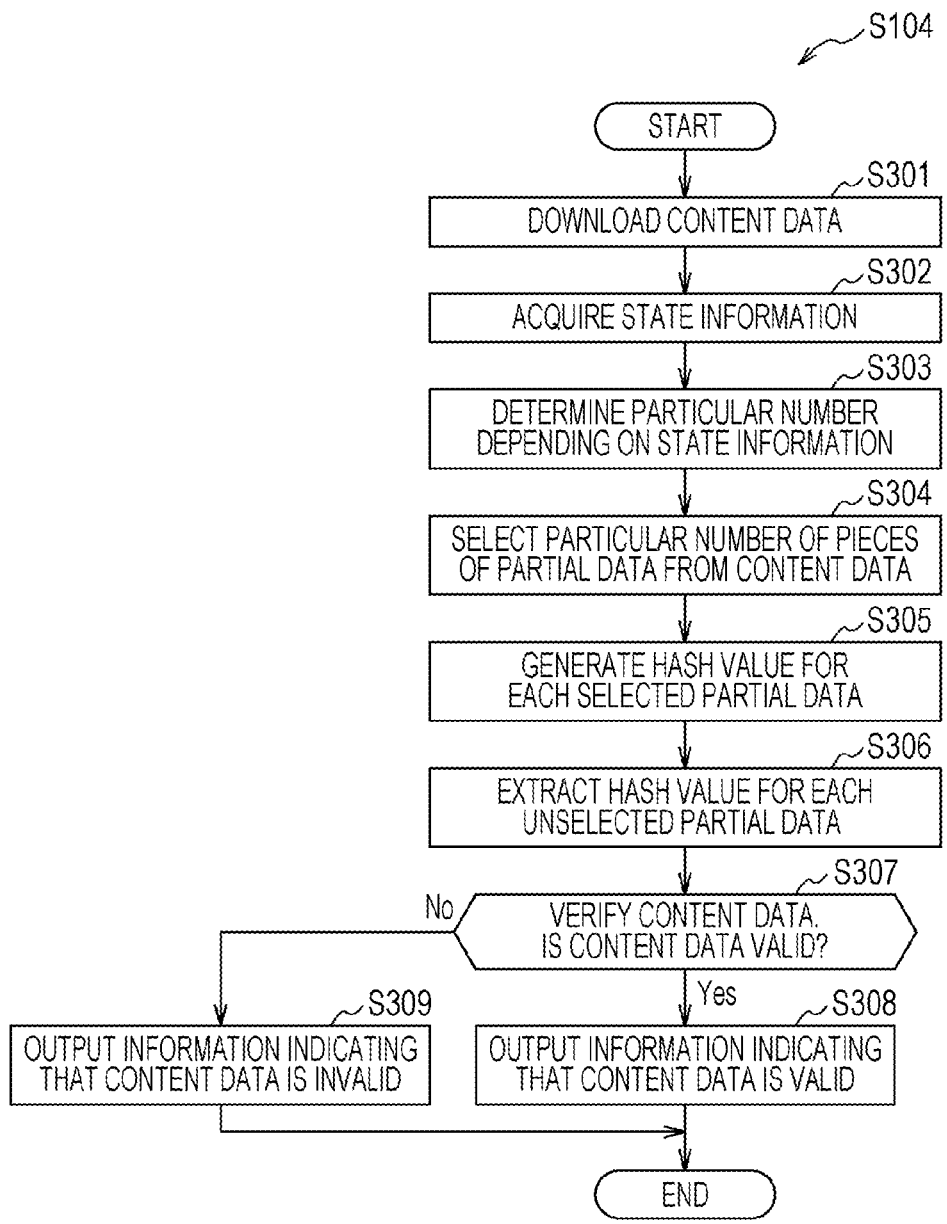
FIG. 9 is a flow chart illustrating a process performed by a vehicle to verify content data according to an embodiment.

FIG. 9 is a flow chart illustrating a process performed by the vehicle 100a to verify content data according to the present embodiment. In the flow chart shown in FIG. 9, the step S104 in FIG. 6 is described in further detail.

In step S301, the content verifier 1001 of the vehicle 100a downloads content data from the server 200 thereby acquiring the content data. The content data acquired here corresponds to the verifiable content data C2 described above. More specifically, the content data includes main content data, a plurality of first hash values respectively generated from pieces of partial data obtained by dividing the main content data, and a signature generated using the plurality of first hash values and a secret key.

In step S302, the content verifier 1001 of the vehicle 100a acquires state information indicating a state of the vehicle 100a. The state information of the vehicle 100a is acquired from the vehicle state storage 1004.

In step S303, the content verifier 1001 of the vehicle 100a determines the particular number depending on the state information acquired in step S302.

In step S304, the content verifier 1001 of the vehicle 100a selects a particular number of pieces of partial data from all pieces of partial data included in the downloaded content data. Note that the particular value is an integer greater than or equal to 1. This particular value will also be denoted by N.

In step S305, the content verifier 1001 of the vehicle 100a generates a hash value for each partial data selected in step S304. The hash function used in generating the hash values is determined in advance in the content verification system 10.

In step S306, the content verifier 1001 of the vehicle 100a extracts a hash value corresponding to each piece of partial data which was not selected in step S304 from the hash values included in the data for verification in the content data received in step S301.

In step S307, the content verifier 1001 of the vehicle 100a verifies the content data using the hash value generated for each piece of partial data selected in step S304, the hash value corresponding to each piece of partial data which was not selected in step S304 and extracted in step S306, and the signature included in the data for verification associated with the content data, thereby determining whether the content data is valid or not. In the verification of the content data, the public key provided by the server 200 is used. In a case where it is determined that the content data is valid (Yes in step S307), the processing flow proceeds to step S308, but otherwise (No in step S307) the processing flow proceeds to step S309.

In step S308, the content verifier 1001 of the vehicle 100a outputs information indicating that the content data downloaded in step S301 is valid content data.

In step S309, the content verifier 1001 of the vehicle 100a outputs information indicating that the content data downloaded in step S301 is not valid, that is, the content data downloaded in step S301 is invalid content data. In this case, this content data may be discarded.

Figure 10:
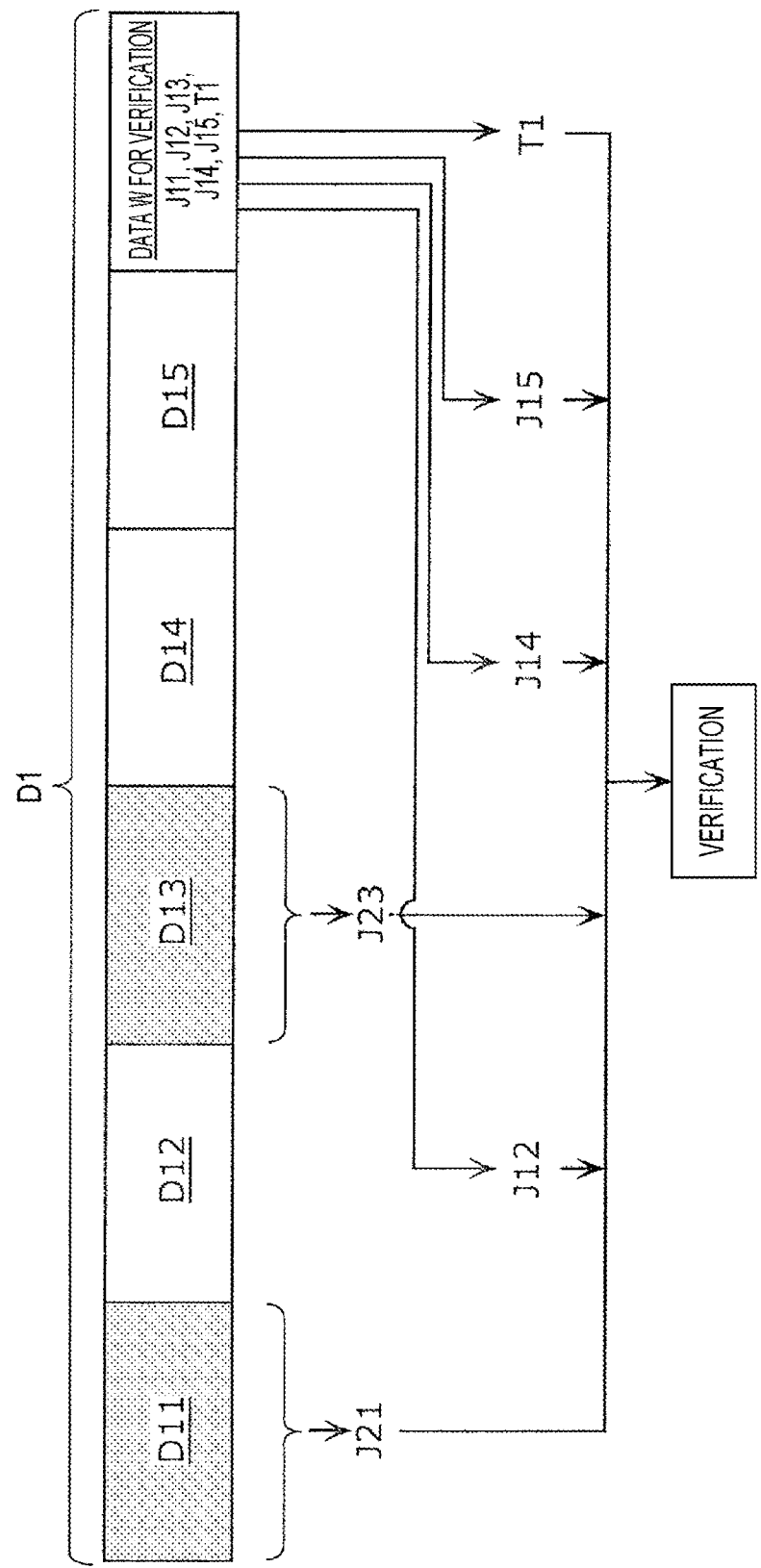
FIG. 10 is a schematic diagram illustrating a process of verifying content data according to an embodiment.

FIG. 10 is a schematic diagram illustrating a process of verifying content data according to the present embodiment. More specifically, the process in step S302 to S305 described above is explained. In FIG. 10, the explanation is given about a process of verifying verifiable content data D1. Note that the verifiable content data D1 corresponds to the verifiable content data C2 generated in FIG. 8.

In FIG. 10, the verifiable content data D1 includes five pieces of partial data D11, D12, D13, D14, and D15, and data for verification W. The data for verification W includes hash values J11, J12, J13, J14, and J15, and the signature T1 calculated by the server 200.

The content verifier 1001 of the vehicle 100a selects a particular number of pieces of partial data from the five pieces of partial data. Here it is assumed that the particular number is equal to 2, and two pieces of partial data D11 and D13 are selected (step S302).

Next, a hash value J21 is generated for the selected partial data D11, and a hash value J23 is generated for the partial data D13 (step S303). Hereinafter, the hash values J21 and J23 will also be referred to as the second hash values.

Furthermore, the hash values corresponding to the not-selected partial data D12, D14, and D15 are extracted from the data for verification W of the verifiable content data D1 (step S304). In this specific example, the hash value J12 corresponding to the partial data D12 is extracted, the hash value J14 corresponding to the partial data D14 is extracted, and the hash value J15 corresponding to the partial data D15 is extracted.

Next, the content data D1 is verified using the hash values J21, J12, J23, J14, and J15 and the signature T1 included in the data for verification W (step S305).

Note that when the particular number of pieces of partial data are selected in step S302, the particular number of pieces of partial data may be selected randomly from the plurality of pieces of partial data. In this case, in step S303, the hash value J23 or the like is generated for each of the particular number of pieces of partial data selected. In this case, a change always occurs in which pieces of partial data for use in the verification are selected from the plurality of pieces of partial data, and thus this makes it possible to more effectively detect malicious data such as spoofing data.

Note that in the determination of the particular number in step S303, in a case where the running state information indicates that the vehicle 100a is running, the particular number may be set to a first value, while in a case where the vehicle 100a is not running, the particular number may be set to a second value greater than the first value. In other words, the particular number may be varied depending on the state information stored in the vehicle state storage 1004. For example, in a case where the state information (more specifically, the running state information) indicates that the vehicle 100a is not "running", that is, the vehicle 100a is "parked" or "stopped", it is possible to take a longer time to verify content data than in a case where the vehicle 100a is in a "running" state, and thus the particular number may be set to be greater than in the "running" state. More specifically, when the state information indicates the "parked" state or the "stopped" state, the particular number may be set to be equal to 0.3 times the total number of pieces of partial data, while when the state information indicates the "running" state, the particular number may be set to be equal to 0.1 times the total number of pieces of partial data. By setting the particular number in the above-described manner, it is possible to achieve an advantage that in a case where it is allowed to take a relatively long time to perform verification, it is allowed to verify content data in more detail, while in a case where it is allowed to take only a relatively short time to perform verification, the verification is ended in the short time such that the content data is made usable.

In the determining of the particular number in step S303, depending on load information associated with the gateway 101 which is an apparatus that performs the present process, the particular number may be set such that the higher the processing load, the smaller the particular number. Furthermore, depending on amount-of-communication information associated with the gateway 101, the particular number may be set such that the greater the amount of communication, the smaller the particular number. By setting the particular number in the above-described manner, it is possible to achieve an advantage that in a case where the processing power available for the verification is relatively high, it is allowed to verify content data in more detail, while in a case where the processing power available for the verification is relatively low, the verification is completed in a brief manner such that the content data is made usable.

Note that when the particular number is determined in step S303, the particular number may be determined depending on a type or a size of the content data. This makes it possible to perform the verification using an optimum number of pieces of partial data depending on the type or the size of the content data.

In the determining of the particular number in step S303, a determination may be performed, based on the type of the content data, as to which part of the plurality of pieces of partial data are to be selected as the particular number of pieces of partial data. In a case where it is known what kind of contents are included in the respective pieces of partial data depending on the type of the content data, it is possible to select particular part of the plurality of pieces of partial data which are more necessary to be subjected to the verification.

The type of the content data may include a measure indicating an update interval of the content data. This makes it possible to indicate a specific type of the content based on the update time interval of the content data. Sequence of uploading sensor information from vehicle 100a to server 200

Figure 11:
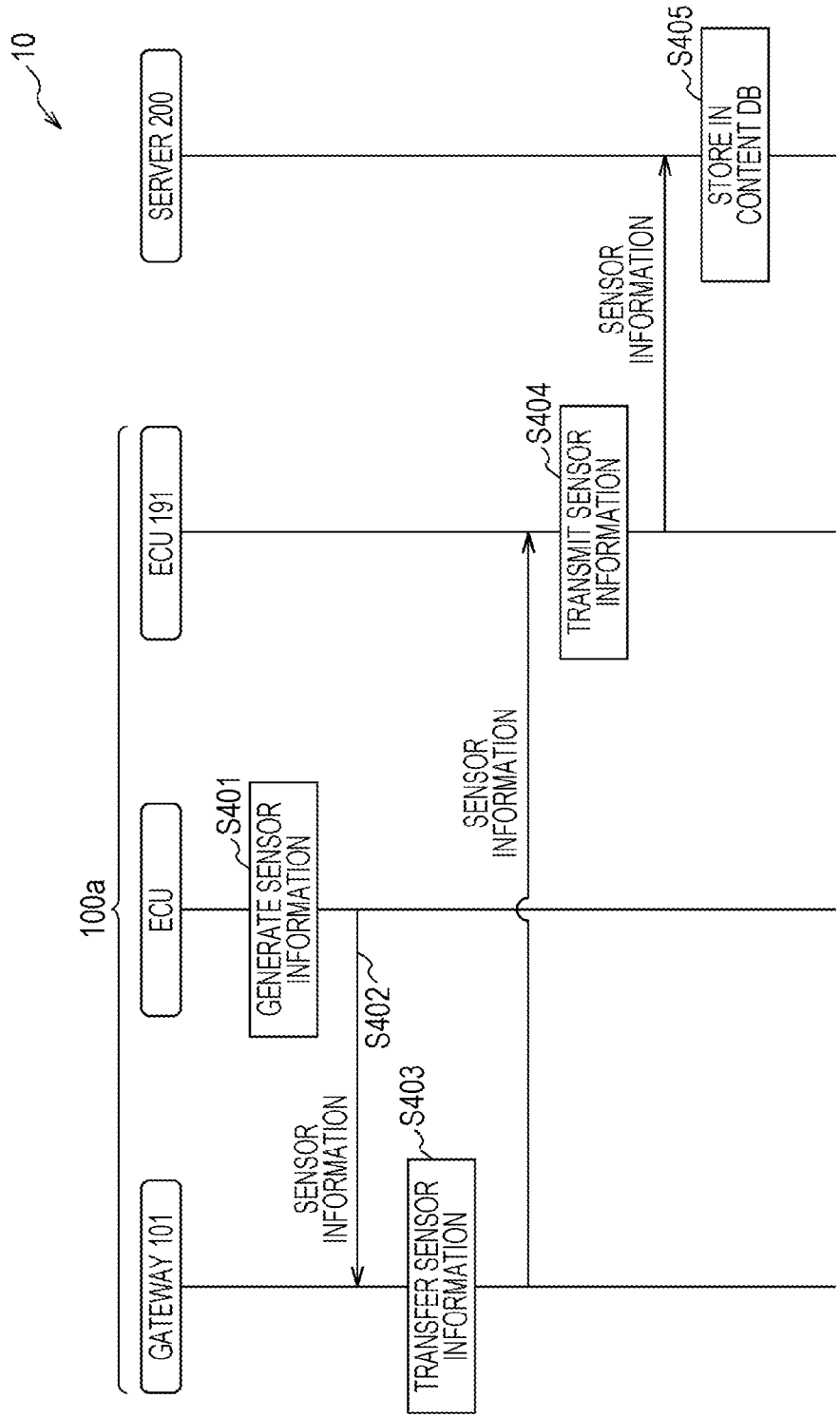
FIG. 11 is a sequence diagram illustrating a process of uploading sensor information from a vehicle to a server according to an embodiment.

FIG. 11 is a sequence diagram illustrating a process of uploading sensor information from the vehicle 100a to the server 200 according to the present embodiment.

In step S401, an ECU having a sensor of the vehicle 100a generates sensor information. The sensor is, for example, a camera configured to capture an image using visible light or a millimeter-wave radar.

In step S402, the ECU of the vehicle 100a transmits the sensor information to the gateway 101.

In step S403, the gateway 101 of the vehicle 100a transfers the sensor information to the ECU 191.

In step S404, the ECU 191 transmits (uploads) the sensor information acquired from the ITS apparatus 190 to the server 200.

In step S405, the server 200 receives the sensor information from the vehicle 100a and stores it in the content DB 202. Sequence of uploading sensor information from traffic signal 300 to server 200

Figure 12:
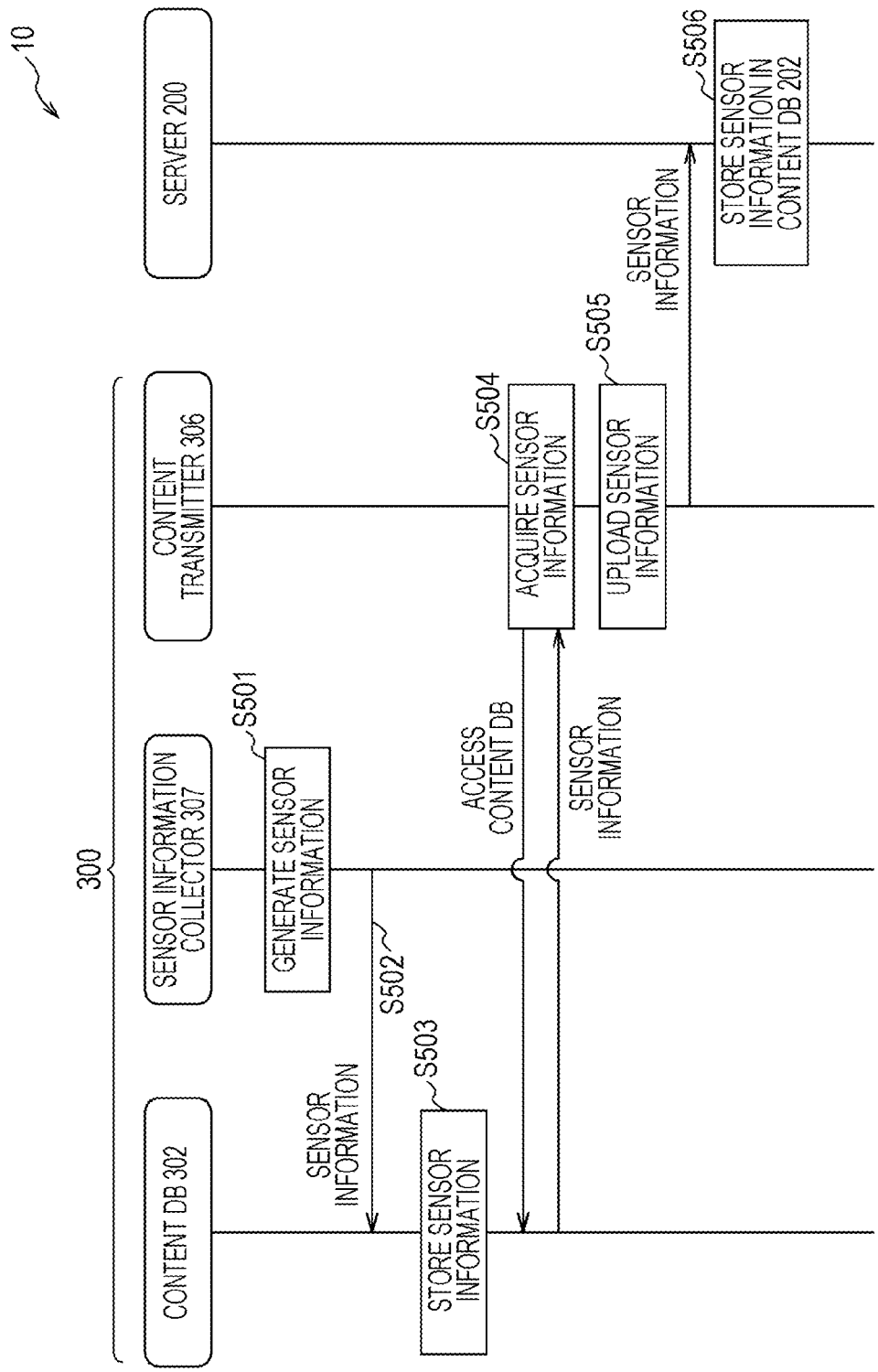
FIG. 12 is a sequence diagram illustrating a process of uploading sensor information from a traffic signal to a server according to an embodiment.

FIG. 12 is a sequence diagram illustrating a process of uploading sensor information from the traffic signal 300 to the server 200 according to the present embodiment.

In step S501, the sensor information collector 307 generates sensor information. The sensor information is, for example, information indicating a road condition around the traffic signal 300, information indicating an image of the surroundings of the traffic signal 300 captured by a camera, or the like.

In step S502, the sensor information collector 307 transmits the sensor information to the content DB 302.

In step S503, the content DB 302 stores the sensor information.

In step S504, to acquire the sensor information stored in the content DB 302, the content transmitter 306 accesses the content DB 302 and acquires the sensor information.

In step S505, the content transmitter 306 uploads the sensor information to the server 200.

In step S506, the server 200 receives the sensor information from the traffic signal 300 and stores the sensor information in the content DB 202.

1.7 Advantageous Effects of the Embodiment

In the verification method according to the present embodiment, when the gateway 101 functioning as the verification apparatus verifies large-size content data including map information or the like, part of the content data is selected depending on a state of a vehicle and the selected part of the content data is used in the verification. This makes it possible to quickly verify the content data while maintaining a practical security level, and thus it becomes possible to build a secure system.

An attacker does not have a secret key, and thus it is difficult for the attacker to generate a valid signature. Therefore, the verification apparatus is capable of verifying whether content data is valid or not, using a signature included in verification data for verifying the content data. That is, it is possible to detect an alteration of content data made by an attacker. The above-described ability of the verification apparatus to verify whether content data is valid or not makes it possible to build a secure system in which detected invalid content data is discarded and only valid content data is used in an autonomous driving operation of a vehicle or other operations. As described above, the verification apparatus is capable of verifying a content, in use of autonomous driving of the vehicle, using the optimized content verification method.

Furthermore, when the verification apparatus verifies large-size content data including map information or the like, part of the content data is selected randomly and the verification is performed on the selected part of the content data. This makes it possible to perform quick verification while maintaining a practical security level, and thus it becomes possible to build a secure system.

In this case, the verification of the content data in the vehicle is performed such that the content data is divided into a plurality of pieces of partial data, and the verification is performed on a particular number of pieces of partial data randomly selected from the whole pieces of partial data. In a case where an attacker attacks the system such that the content data is tampered with, there is a high probability that the selected pieces of partial content data include an alteration made by the attacker. Therefore, the verification apparatus is capable of more effectively verifying whether the content data is valid or not, which makes it possible to achieve higher security in the system.

In this case, a change always occurs in terms of which pieces of partial data for use in the verification are selected from the plurality of pieces of partial data, and this makes it possible to more effectively detect malicious data such as spoofing data. Therefore, the verification apparatus is capable of verifying a content, in use of autonomous driving of the vehicle, using a more optimum content verification method.

Furthermore, in the verification apparatus, in a case where it is allowed to take a relatively long time to perform verification, it is allowed to verify content data in more detail, while in a case where it is allowed to take only a relatively short time to perform verification, the verification is ended in the short time such that the content data is made usable. Thus, the verification apparatus is capable of verifying a content, in use in autonomous driving of the vehicle, using the optimized content verification method depending on the length of the time available for the verification.

Furthermore, in a case where a relatively high processing power is available to perform the verification, the verification apparatus verifies the content data in more detail, while in a case where a relatively low processing power is available to perform the verification, the verification apparatus completes the verification of the content data in a brief manner thereby making the content data usable. Thus, the verification apparatus is capable of verifying a content, in use in autonomous driving of the vehicle, using the content verification method optimized depending on the processing power available for the verification.

In a case where amount-of-communication information indicates that a relatively high processing power is available to perform the verification, the verification apparatus is allowed to verify the content data in more detail, while in a case where a relatively low processing power is available to perform the verification, the verification apparatus completes the verification of the content data in a brief manner thereby making the content data usable. Thus, the verification apparatus is capable of verifying a content, in use in autonomous driving of the vehicle, using the content verification method optimized depending on the processing power available for the verification.

The verification apparatus is capable of verifying a particular number of pieces of partial data selected optimally depending on the type or the size of the content data. Thus, the verification apparatus is capable of verifying a content, in use in autonomous driving of the vehicle, using the content verification method optimized depending on the type or the size of the content data.

In a case where it is known what kind of data is included in which pieces of partial data depending on the type of the content data, the verification apparatus is capable of selecting particular pieces of partial data which are more necessary to be subjected to the verification and performing the verification on the selected pieces of partial data. Thus, the verification apparatus is capable of verifying a content, in use in autonomous driving of the vehicle, using the content verification method optimized such that particular pieces of partial data more necessary to be verified are subjected to the verification.

In the verification apparatus, the type of the content may be indicated by the update interval of the content data, which makes it possible to verify the content, in use in autonomous driving of the vehicle, using the optimized content verification method.

2. Other Modifications

Although the present disclosure has been described above with reference to embodiments, the present disclosure is not, as a matter of course, limited to the embodiments described above. The present disclosure also includes in its scope the following.

(1) In the embodiments described above, it is assumed by way of example but not limitation that the in-vehicle network is a CAN network or an Ethernet (registered trademark) network or a combination thereof. Alternatively, for example, the in-vehicle network may be a CAN-FD (CAN with Flexible Data Rate) network, a LIN (Local Interconnect Network) network, or a FlexRay (registered trademark) network, or an arbitrary combination thereof.

The embodiments described above are applied to achieve high cyber security in the in-vehicle network installed in a vehicle. However, the applications are not limited to those examples. The embodiments may be applied to achieve high security not only in vehicles but also mobilities such as construction machines, farm machines, vessels, railways, airplanes, or the like.

That is, the embodiments described above may be applied to achieve high cyber security in mobility networks and mobility network systems.

Furthermore, the embodiments can also be applied to communication networks used in factories or industrial control systems or can be applied to communication networks for controlling embedded devices. In a case where the embodiments are applied to such communication networks, the value of the integer N greater than or equal to may be determined depending on traffic congestion or operation sates of the communication networks, and the second hash values may be generated based on the determined value of N.

For example, in the generating of the second hash values, in a case where the value of N is selected depending on the traffic congestion in the network, the value of N may be determined such that the higher the congestion is, the smaller the value of N is. Using the determine value of N, the second hash values may be generated respectively from the N pieces of partial data.

For example, the operation state may indicate whether the communication network is in a normal operation state or in an urgent operation state. In the generating of the second hash values, in a case where the communication network is in the urgent operation state, the value of N may be set to a first value, while in a case where the communication network is in the normal operation state, the value of N may be wet to a second value greater than the first value. Using the determine value of N, the second hash values may be generated respectively from the N pieces of partial data.

Furthermore, the operation state is not limited to that of the communication network, but the operation state may indicate the operation state of an industrial control system.

(2) In the embodiments described above, it is assumed by way of example but not limitation that gear information or speed information relating to the transmission is acquired from a message transmitted in the in-vehicle network, thereby acquiring state information indicating the state of the vehicle. Alternatively, state information may be estimated from image information provided from an in-vehicle camera, information provided from a GPS system, a millimeter-wave radar, or a laser radar, or a combination thereof. For example, a determination may be made from a condition around of the vehicle represented by image information provided by the in-vehicle camera as to whether the vehicle is "running", "parked", or "stopped".

(3) In the embodiments described above, it is assumed by way of example but not limitation that a particular number of pieces of partial data are selected from the content data, and a hash value is generated for each of the selected pieces of partial data. However, the particular number may be changed not only depending on the state information but also depending on the type of the size of the acquired content data. In a case where the size of the content data is relatively small, all pieces of partial data of the content data may be selected. In this case, the verification is performed for the whole content data.

(4) In the embodiments described above, it is assumed by way of example but not limitation that pieces of partial content data divided from the content data are randomly selected. Alternatively, the method of selecting pieces of divided content data may be changed depending on the type of the acquired content data. For example, in a case where the content data is map data, a piece of divided content data including map data associated with an area close to the vehicle location may be selected, or a difference from a previously acquired piece of divided content data of map data may be selected. In a case where map data includes dynamic information superimposed on static information as with a dynamic map, a piece of divided content data including a large amount of dynamic information may be selected. By intentionally selecting a piece of divided content data having a large difference from a previously received content data, it is possible to efficiently verify the content data.

(5) In the embodiments described above, it is assumed by way of example but not limitation that a signature is used as verification data for verifying content data. In a case where a vehicle has the same secret key as that used by a server or a traffic signal, MAC (Message Authentication Code) of the content data may be used as data for verification. In this case, CMAC or HMAC may be used as MAC.

(6) In the embodiments described above, it is assumed by way of example but not limitation that a signature is generated for hash values of the content data. The hash values of the respective plurality of pieces of partial data may be combined, a hash value may be further generated for the combined hash value, and a signature may be generated for this hash value. This results in a reduction in the length of the hash value for which the signature is generated, which makes it possible to an increase in efficiency in generating the signature.

(7) A specific example of each apparatus according to the embodiment described above is a computer system including a microprocessor, a ROM, a RAM, a hard disk unit, a display unit, a keyboard, a mouse, and the like. A computer program is stored in the RAM or the hard disk unit. In each apparatus, the microprocessor operates according to the computer program thereby achieving a function thereof. The computer program is a combination of a plurality of instruction codes indicating instructions that are given to the computer to achieve a particular function.

(8) Part or all of the constituent elements of each apparatus according to the embodiment described above may be implemented in a single system LSI (Large Scale Integration). The system LSI is a super-multifunction LSI produced such that a plurality of parts are integrated on a single chip. More specifically, the system LSI is a computer system including a microprocessor, a ROM, a RAM, and so on. A computer program is stored in the RAM. In the system LSI, the microprocessor operates according to the computer program thereby achieving the function of the system LSI.

Each of the constituent elements of each apparatus described above may be integrated separately on a single chip, or part or all of the apparatus may be integrated on a single chip.

Although in the above description, the term system LSI is used, it is also called an IC, an LSI, a super LSI, or an ultra LSI depending on the integration density. The method of implementing the integrated circuit is not limited to the LSI, but the integrated circuit may be implemented in the form of a dedicated circuit or a general-purpose processor. Alternatively, the LSI may be implemented in the form of an FPGA (Field Programmable Gate Array) that allows programming to be performed after the LSI is produced, or the LSI may be implemented in the form of a reconfigurable processor that allows it to reconfigure interconnections among circuit cells in the LSI or reconfigure setting.

As a matter of course, if a progress of a semiconductor technology or another technology derived therefrom provides a new technology for realizing an integrated circuit which can replace the LSI, functional blocks may be integrated using the new technology. Use of biotechnology is potentially possible.

(9) Part or all of the constituent elements of each apparatus described above may be implemented in the form of an IC card attachable to the apparatus or in the form of a single module. The IC card or the module is a computer system including a microprocessor, a ROM, a RAM, and so on. The IC card or the module may include the super-multifunction LSI described above. In the IC card or the module, the microprocessor operates according to the computer program thereby achieving the function of the IC card or the module. The IC card or the module may be configured so as to be resistant against tampering.

(10) The present disclosure may be implemented as the method described above. The method may be realized by a computer program that is to be executed by a computer, or the method may be realized by a digital traffic signal associated with the computer program.

The present disclosure may be implemented by a computer readable storage medium, such as a flexible disk, a hard disk, a CD-ROM disk, an MO disk, a DAD disk, a DVD-ROM disk, a DVD-RAM disk, a BD (Blu-ray Disc), a semiconductor memory, or the like in which the computer program or the digital traffic signal are stored. Alternatively, the digital traffic signal may be recorded in the storage medium described above.

The present disclosure may be implemented by transmitting the computer program or the digital traffic signal via a telecommunication line, a wired or wireless communication line, a network typified by the Internet, data broadcasting, or the like.

The present disclosure may be implemented by a computer system including a microprocessor and a memory, wherein the computer program is stored in the memory and the microprocessor operates according to the computer program.

The program or the digital traffic signal may be stored in the storage medium, and the storage medium may be transported, or the program or the digital traffic signal may be transferred via the network or the like thereby allowing the present disclosure to be implemented in another separate computer system.

(11) The above-described embodiments and the modifications may be combined.

In each embodiment described above, each constituent element may be realized using dedicated hardware or may be realized by executing software program corresponding to the constituent element. Each constituent element may be realized by a program execution unit such as a CPU, a processor or the like by reading software program stored in a storage medium such a hard disk, a semiconductor memory, or the like and executing the software program. The software that realizes the verification apparatus according to each embodiment described above may be a program described below.

That is, the program causes a computer to execute a verification method for verifying content data used in a vehicle, the method including acquiring the content data, a plurality of first hash values respectively generated from a plurality of pieces of partial data obtained by dividing the content data, and a signature generated using the plurality of first hash values and a secret key, acquiring state information indicating a state of the vehicle, determining an integer N greater than or equal to 1 depending on the acquired state information, and generating second hash values respectively from N pieces of partial data included in the plurality of pieces of partial data, verifying the content data using (a) first hash values which are included in the acquired plurality of first hash values but which are those respectively generated from partial data other than the N pieces of partial data in the plurality of pieces of partial data, (b) the generated second hash values, and (c) the acquired signature, and outputting information indicating a result of the verification.

The present disclosure has been described above with reference to the verification apparatus and related techniques according to one or more embodiments. However, the present disclosure is not limited to those embodiments. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure.

According to the present disclosure, when large size content data such as map information or the like is downloaded, a part of the content is randomly selected and verified. This makes it possible to perform the verification in an efficient manner while maintaining a practical security level. Thus it becomes possible to build a secure system.

What is claimed is:

1. A verification method for verifying content data to be used in a mobility entity, the verification method comprising:
acquiring the content data, the content data including main content data, a plurality of first hash values respectively generated from a first plurality of pieces of partial data obtained by dividing the main content data, and a signature generated using the plurality of first hash values and a secret key;
extracting, from the content data, the respective plurality of first hash values;
extracting, from the content data, the signature;
acquiring state information that indicates a state of the mobility entity;

determining an integer N that is greater than or equal to one based on the acquired state information, in a case where a size of the content data is greater than a predetermined size;

determining the integer N as a number of all pieces of partial data, in a case where a size of the content data is less than or equal to the predetermined size;

generating, from N pieces of partial data included in the first plurality of pieces of partial data, respective second hash values;

verifying the content data by using each of (a) a subset of the extracted plurality of first hash values which are those respectively corresponding to partial data other than the N pieces of partial data, (b) the generated second hash values, and (c) the extracted signature; and outputting information that indicates a result of the verifying.

2. The verification method according to claim 1, wherein the state information indicates whether the mobility entity is running or not running, and in the determining,
in response to a determination that the mobility entity is running, a value of the integer N is determined so as to be equal to a first value, and
in response to a determination that the mobility entity is not running, the value of the integer N is determined so as to be equal to a second value that is greater than the first value, and
the value of the integer N is determined based on a type or a size of the content data.

3. The verification method according to claim 1, wherein the generating includes:
randomly selecting the N pieces of partial data from the first plurality of pieces of partial data, and
generating a corresponding one of the respective second hash values from each of the selected N pieces of partial data.

4. The verification method according to claim 1, wherein the state information indicates, as the state of the mobility entity, a processing load imposed on an apparatus that executes the verification method, and in the determining,
a value of the integer N is determined such that the higher the processing load is, the smaller the value of the integer N is.

5. The verification method according to claim 1, wherein the state information indicates, as the state of the mobility entity, an amount of communication data included in a communication performed by an apparatus that executes the verification method, and in the determining,
a value of the integer N is determined such that the greater the amount of communication data is, the smaller the value of the integer N is.

6. The verification method according to claim 1, wherein the determining includes determining, based on a type of the content data, which pieces of the first plurality of pieces of partial data are selected as the N pieces of partial data.

7. The verification method according to claim 1, wherein the type of the content data includes a measure that indicates an update interval of the content data.

8. The verification method according to claim 1, wherein the key is a secret key.

9. A verification apparatus that verifies content data to be used in a mobility entity, comprising:
a processor; and
a memory that includes at least one set of instructions that, when executed by the processor, causes the processor to execute operations including:
acquiring the content data, the content data including main content data, a plurality of first hash values respectively generated from a first plurality of pieces of partial data obtained by dividing the main content data, and a signature generated using the plurality of first hash values and a secret key;
extracting, from the content data, the respective plurality of first hash values;
extracting, from the content data, the signature;
acquiring state information that indicates a state of the mobility entity;
determining an integer N that is greater than or equal to one based on the acquired state information, in a case where a size of the content data is greater than a predetermined size;
determining the integer N as a number of all pieces of partial data, in a case where a size of the content data is less than or equal to the predetermined size;
generating, from N pieces of partial data included in the first plurality of pieces of partial data, respective second hash values;
verifying the content data by using each of (a) a subset of the extracted plurality of first hash values which are those respectively corresponding to partial data other than the N pieces of partial data, (b) the generated second hash values, and (c) the extracted signature; and
outputting information that indicates a result of the verifying.

10. A non-transitory computer-readable recording medium storing a program for verifying content data to be used in a mobility entity, the program causing, when executed by a computer, the computer to implement a method, the method comprising:
acquiring the content data, the content data including main content data, a plurality of first hash values respectively generated from a first plurality of pieces of partial data obtained by dividing the main content data, and a signature generated using the plurality of first hash values and a secret key;
extracting, from the content data, the respective plurality of first hash values;
extracting, from the content data, the signature;
acquiring state information that indicates a state of the mobility entity;
determining an integer N that is greater than or equal to one based on the acquired state information, in a case where a size of the content data is greater than a predetermined size;
determining the integer N as a number of all pieces of partial data, in a case where a size of the content data is less than or equal to the predetermined size;
generating, from N pieces of partial data included in the first plurality of pieces of partial data, respective second hash values;
verifying the content data by using each of (a) a subset of the extracted plurality of first hash values which are those respectively corresponding to partial data other than the N pieces of partial data, (b) the generated second hash values, and (c) the extracted signature; and
outputting information that indicates a result of the verifying.

11. A verification method for verifying content data to be used in a mobility, comprising:

acquiring the content data, the content data including main content data, a plurality of first hash values respectively generated from a first plurality of pieces of partial data obtained by dividing the main content data, and a signature generated using the plurality of first hash values and a secret key;

extracting, from the content data, the respective plurality of first hash values;

extracting, from the content data, the signature;

acquiring state information that indicates a state of the mobility;

determining an integer N that is greater than or equal to one based on the acquired state information, in a case where a size of the content data is greater than a predetermined size;

determining the integer N as a number of all pieces of partial data, in a case where a size of the content data is less than or equal to the predetermined size;

generating, from N pieces of partial data included in the first plurality of pieces of partial data, respective second hash values;

verifying the content data by using each of (a) a subset of the extracted plurality of first hash values which are those respectively corresponding to partial data other than the N pieces of partial data, (b) the generated second hash values, and (c) the extracted signature; and outputting information that indicates a result of the verifying.

* * * * *

UNITED STATES PATENT AND TRADEMARK OFFICE
CERTIFICATE OF CORRECTION

PATENT NO. : 12,355,896 B2  
APPLICATION NO. : 18/131448  
DATED : July 8, 2025  
INVENTOR(S) : Y. Unagami et al.

Page 1 of 1

It is certified that error appears in the above-identified patent and that said Letters Patent is hereby corrected as shown below:

In the Claims

Column 21, Lines 16-17 (end of Claim 1), please change "outputting information that indicates a result of the verifying" to -- outputting information that indicates a result of the verifying, wherein in the determining, a value of the integer N is determined such that the higher the processing load is or the greater the amount of communication data is, the smaller the value of the integer N is --.

Column 21, Line 43 (Claim 4, Line 6), please change "a value" to -- the value --.

Column 21, Line 45 (Claim 4, Line 8), please change "the integer Nis" to -- the integer N is --.

Column 21, Line 52 (Claim 5, Line 7), please change "a value" to -- the value --.

Column 21, Line 54 (Claim 5, Line 9), please change "the integer Nis" to -- the integer N is --.

Column 22, Lines 31-32 (end of Claim 9), please change "outputting information that indicates a result of the verifying" to -- outputting information that indicates a result of the verifying, wherein in the determining, a value of the integer N is determined such that the higher the processing load is or the greater the amount of communication data is, the smaller the value of the integer N is --.

Column 22, Lines 64-65 (end of Claim 10), please change "outputting information that indicates a result of the verifying" to -- outputting information that indicates a result of the verifying, wherein in the determining, a value of the integer N is determined such that the higher the processing load is or the greater the amount of communication data is, the smaller the value of the integer N is --.

Column 23, Lines 27-28 (end of Claim 11), please change "outputting information that indicates a result of the verifying" to -- outputting information that indicates a result of the verifying, wherein in the determining, a value of the integer N is determined such that the higher the processing load is or the greater the amount of communication data is, the smaller the value of the integer N is --.

Signed and Sealed this  
Twelfth Day of August, 2025

Coke Morgan Stewart  
*Acting Director of the United States Patent and Trademark Office*